United States Patent [19]

Toth

[11] 4,288,682
[45] Sep. 8, 1981

[54] WELDING SYSTEM WITH REVERSIBLE DRIVE MOTOR CONTROL

[75] Inventor: Tibor E. Toth, Florence, S.C.

[73] Assignee: Union Carbide Corporation, New York, N.Y.

[21] Appl. No.: 98,065

[22] Filed: Nov. 28, 1979

[51] Int. Cl.³ .............................................. B23K 9/12
[52] U.S. Cl. ................................................ 219/137.71
[58] Field of Search ..................... 219/137.71; 318/331

[56] References Cited

U.S. PATENT DOCUMENTS 3,141,085 7/1964 Manz ............................... 219/137.71
3,781,620 12/1973 Toth ..................................... 318/331

3,934,110 1/1976 Denis ............................. 219/137.71

Primary Examiner—C. C. Shaw
Attorney, Agent, or Firm—E. Lieberstein

[57] ABSTRACT

Electric welding system having a governor control for regulating the speed of the electrode drive motor and for controlling the direction of motor rotation in response to voltage and current welding parameters such that during welding the motor is driven in a forward direction toward the workpiece and under the control of a weld speed potentiometer whereas during a short circuit condition and at termination of the welding operation the motor direction is reversed.

6 Claims, 5 Drawing Figures

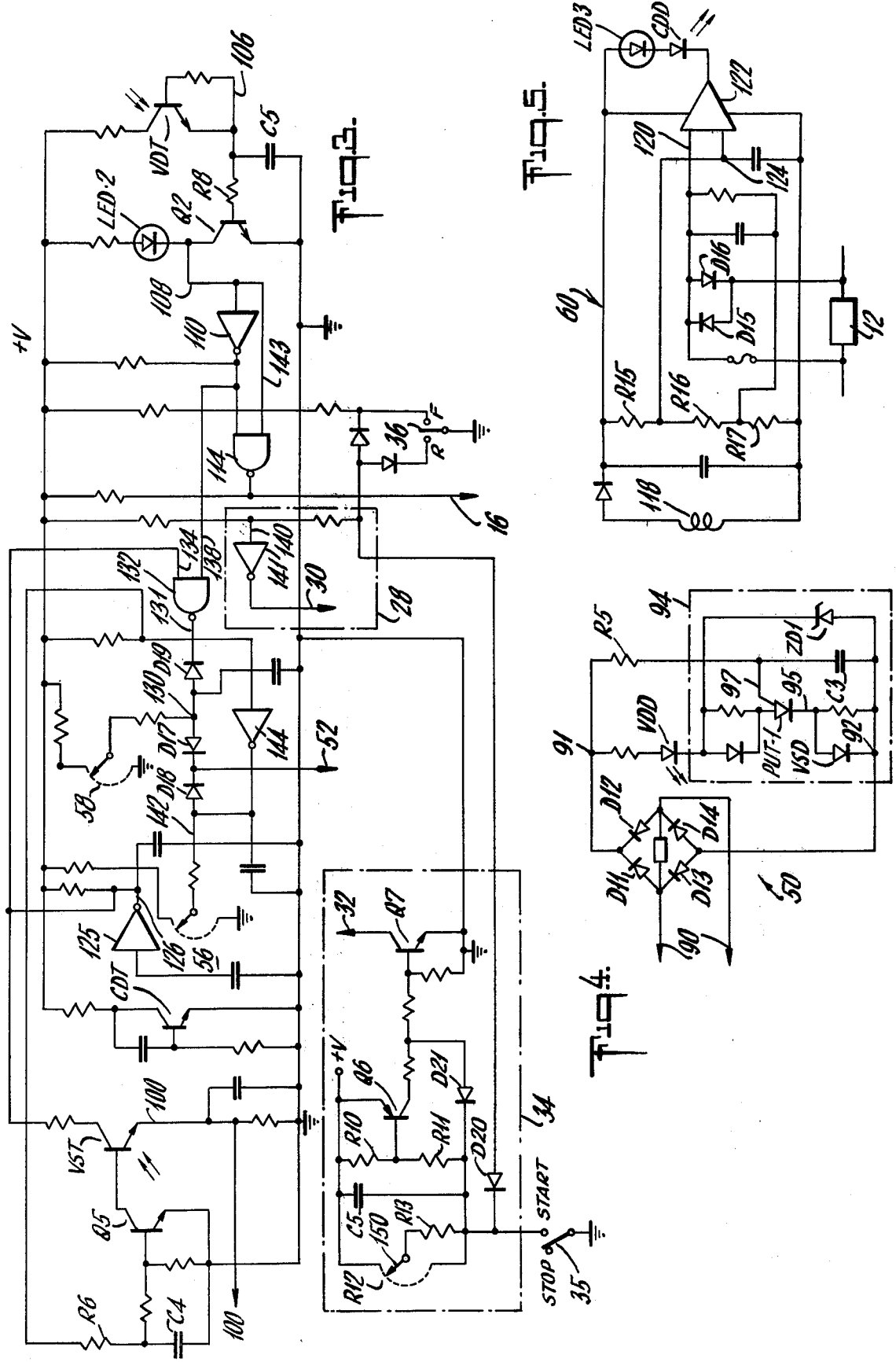

WELDING SYSTEM WITH REVERSIBLE DRIVE MOTOR CONTROL

This invention relates to an electric welding system in combination with a governor control system for regulating the speed and direction of rotation of the electrode drive motor relative to the workpiece.

To establish an arc in a mechanized welding operation using a welding power supply with a constant current characteristic it is necessary to reverse the direction of electrode travel after contact is made with the workpiece. Likewise, the forward electrode feed direction should be automatically restored upon establishing the arc. It is also desirable to automatically reverse the direction of electrode travel at any time during the welding operation in response to a short circuit condition and to automatically restore the forward electrode feed direction upon restoring the arc working conditions. The ability to reverse the direction of electrode feed is also a desirable feature in a mechanized welding operating using a constant potential source of power.

Reversing the direction of electrode feed may be accomplished by reversing the drive motor armature leads or the direction of current flow through the armature. The latter has heretofore been practiced using an arrangement of relays and timing circuits. Relay contacts tend to chatter or bounce and are subject to pitting due to arcing. The rapid deterioration of the relay contacts are inevitable under operating conditions of relatively high pulse current flow typical in electric welding. Accordingly, the mechanical relays used in welding governor controls have a relatively short life and require continuous maintenance.

Currently relays are also used at the end of a mechanized welding operation to brake the motor and prevent the electrode from engaging and solidifying to the workpiece. The braking relay is used to control the dissipation of the stored energy in the motor through a large resistor.

The welding system of the present invention includes a governor control system for the electrode drive motor which eliminates the need for the reversing relay and the braking relay. It is entirely solid state control which will provide positive reversing control over the electrode drive motor at the beginning of the weld, at each occurrence of a short circuit and at the end of the welding operation. The governor control system operates to brake the electrode drive motor at the completion of each weld by reversing the motor direction without the use of a bleed resistor.

Accordingly, it is the principal object of the present invention to provide an electric welding system having a governor control system for controlling the speed and direction of rotation of the electrode relative to the workpiece.

It is a further object of the present invention to provide an electric welding system having a reversible governor control system for the electrode drive motor which includes brake circuit means for automatically braking the drive motor upon termination of the welding operation.

It is another object of the present invention to provide a reversible governor control system for the electrode drive motor of an electric welding system which will automatically regulate the direction of motor rotation and the drive speed in response to predetermined welding conditions.

It is yet a further object of the present invention to provide a reversible governor control system for regulating the speed and direction of an electrode drive motor in an electric welding system in response to the presence of arc current, arc voltage and the magnitude of such arc voltage.

It is an even further object of the present invention to provide a reversible governor control system for the electrode drive motor of an electric welding system which will automatically brake the motor by reversing the motor direction of rotation over a controlled time period.

Other objects and advantages of the present invention will become apparent from the following detailed description of the invention when read in conjunction with the accompanying drawings of which:

FIG. 3 is a further circuit schematic of the governor control of FIG. 1 illustrating the transfer circuit, retract brake, enable logic, inch control and the start/stop selection switch respectively;

FIG. 4 is a circuit schematic of the voltage detector of FIG. 1; and

FIG. 5 is a circuit schematic of the current detector of FIG. 1.

Figure 1:
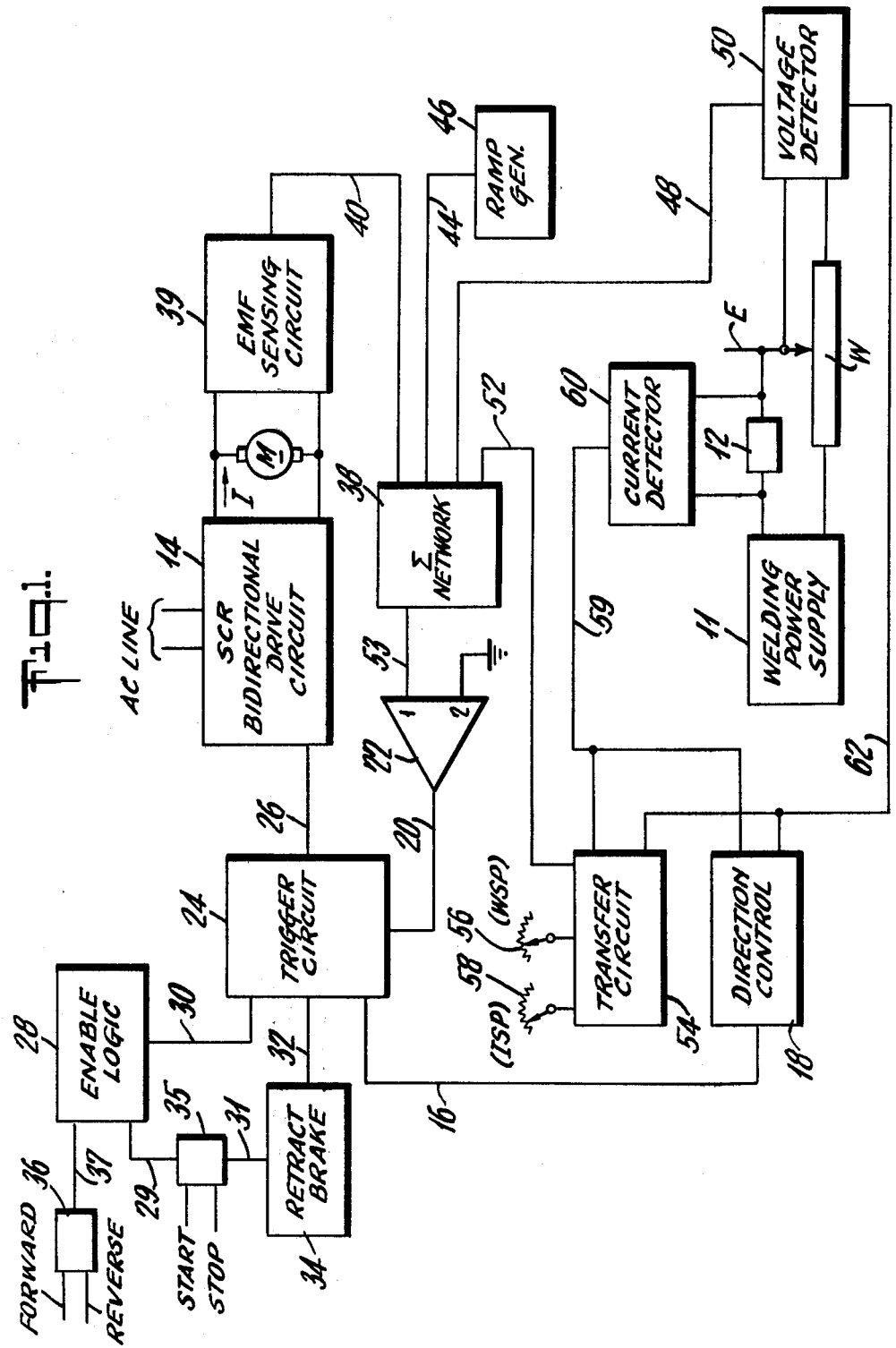
FIG. 1 is a block diagram of the welding system and reversible governor control of the present invention.

The block diagram of the reversible governor control of the present invention is shown in FIG. 1 in combination with an electric welding system comprising a welding power supply 11, a consumable electrode E and a workpiece W to be welded. The welding power supply 11 is of any conventional design having either a constant current or constant potential output characteristic and is connected in series circuit relationship with the consumable electrode E and workpiece W through a shunt 12. The consumable electrode E is driven by the drive motor M through a pair of drive rolls (not shown) in either a forward direction toward the workpiece W or a reverse direction away from the workpiece W. Motor M has a constant voltage speed characteristic in which the back emf of the motor is substantially linearly proportional to the speed of the motor. The speed and direction of rotation of the Motor M is determined by the average magnitude and polarity of the armature voltage generated by an SCR bi-directional drive circuit 14.

The SCR bi-directional drive circuit 14 controls the armature voltage in response to a gating signal 26 from a trigger circuit 24. The trigger circuit 24 receives an input direction signal 16 supplied from the direction control circuit 18 and an input comparator signal 20 supplied from the comparator 22. The direction signal 16 determines the polarity of the armature current I while the comparator signal 20 controls the conduction period of the gating signal 26 for each one-half cycle of the alternating line supply and in turn the motor speed. The trigger circuit 24 optically isolates the bi-directional SCR drive circuit 14 from all other control circuitry in the governor control system of the present invention.

The trigger circuit 24 is also responsive to an enable signal 30 from the enable logic circuit 28 and to a retract brake signal 32 from the retract brake circuit 34. The retract brake signal 32 is generated at the end of the weld in response to the presence of the stop signal 31 from the start/stop selection switch 35. The enable signal 30 is generated by the enable logic 28 in response to the presence of a start signal 29 or an inch signal 37 from the inch control 36. The enable signal 30 enables the trigger circuit 24 to respond to the comparator 22. During inching, the inch control switch 36 provides the direction information for the motor M.

The comparator 22 is a conventional operational amplifier used in an open loop configuration with its input terminal at pin 2 connected to ground potential and with its input terminal at pin 1 connected to the summation network 38. The summation network 38 combines a plurality of predetermined input signals represented by the following: a feedback signal 40, derived from the emf sensing circuit 42; a continuous ramp signal 44 generated by the ramp generator 46; a voltage output signal 48 applied from the voltage detector circuit 50 and a weld speed signal 52 applied from the transfer circuit 54. The summation network 38 applies an input signal 53 to pin 1 of comparator 22 which varies linearly with the ramp signal 44. The input signal 53 is designed to vary from a negative to positive voltage in synchronism with each half cycle of the alternating line supply. Any change in amplitude in either the feedback signal 40, the output signal 48 or the weld speed signal 52 will cause a displacement of the instantaneous crossover point of the signal 53 in each half cycle. The comparator 22 generates a constant amplitude output 20 of either a positive or negative polarity depending upon the polarity of the input signal 53. Thus, the output 20 is a pulse waveform with the pulse duration in each half cycle determined by the input signal 53. The concept of using a ramp signal to provide a balanced drive in phase with the input frequency of the line supply to control the speed of a drive motor in an electric welding system is disclosed in U.S. Pat. No. 3,781,620 entitled "Full Wave Governor Control System", which issued Dec. 25, 1973 in the name of Tibor E. Toth, the disclosure of which is herein incorporated by reference.

In the present system the back emf signal 40 is negative and the weld speed signal 52 is positive. The weld speed signal 52 is controlled by the transfer circuit 54 operating from either the weld speed potentiometer 56 or the inch speed potentiometer 58 as will be more fully discussed hereafter. The motor M is driven during either positive or negative half cycles of the line supply for a predetermined conduction period determined by the polarity of output 20 of comparator 22. During welding adjustment of the weld speed potentiometer 56 will operate to directly change the speed of motor M. Alternatively, during inching, adjustment of the inch speed potentiometer 58 will operate to change the speed of motor M. In the inch mode of operation the enable logic circuit 28 is directed by the inch control 36 and directly provides a direction command.

The transfer from the inch speed potentiometer 58 to the weld speed potentiometer 56 and vice versa is accomplished automatically by the transfer circuit 54 in response to the presence of an arc current signal 59 generated by the current detector 60 and in response to the presence or absence of an arc voltage signal 62 generated by the voltage detector 50. The presence of arc current without arc voltage represents a short circuit condition which is sensed by the direction control circuit 18 to cause a reversal in motor direction and a retraction of the electrode E away from the workpiece W. The forward feed direction is restored upon sensing the presence of arc current and arc voltage.

The schematic circuit for each of the various blocks identified in FIG. 1 are shown in FIGS. 2-5 inclusive. The bi-directional drive circuit 14 is shown in dotted lines in FIG. 2. The direction of the current I through the motor M depends upon which one of two power SCR's, SCR-1 and SCR-2 is energized. For present purposes SCR-1 is used to control the forward drive direction and SCR-2 the reverse drive direction. The forward drive direction is established by activating the photo-transistor FCT. When this occurs a gate signal is applied to the control electrode 66 of the silicon controlled rectifier SCR-1 thereby completing a circuit from the applied 120 volt line source through SCR-1 and motor M. The direction of current through SCR-1 and the motor M is designated the forward drive direction. To establish reverse drive the optical phototransistor RCT must be activated. When this occurs a gate signal is impressed upon the control electrode 68 of the silicon controlled rectifier SCR-2 thereby completing a circuit from the applied 120 volt line source through SCR-2 and motor M in the designated reverse drive direction. A visual indicator LED 1 is connected in circuit through motor M and the 120 volt line source when the motor M is operating in the reverse direction with SCR-2 energized. The motor M may be of the constant field DC type having a separate wound field 69 energized from the 120 volt line supply through a full wave bridge rectifier comprising diodes D1, D2, D3 and D4 respectively. It should be understood that any type motor may be used which exhibits a common voltage speed characteristic with its back emf proportional to speed such as the permanent magnet excited motor.

Figure 2:
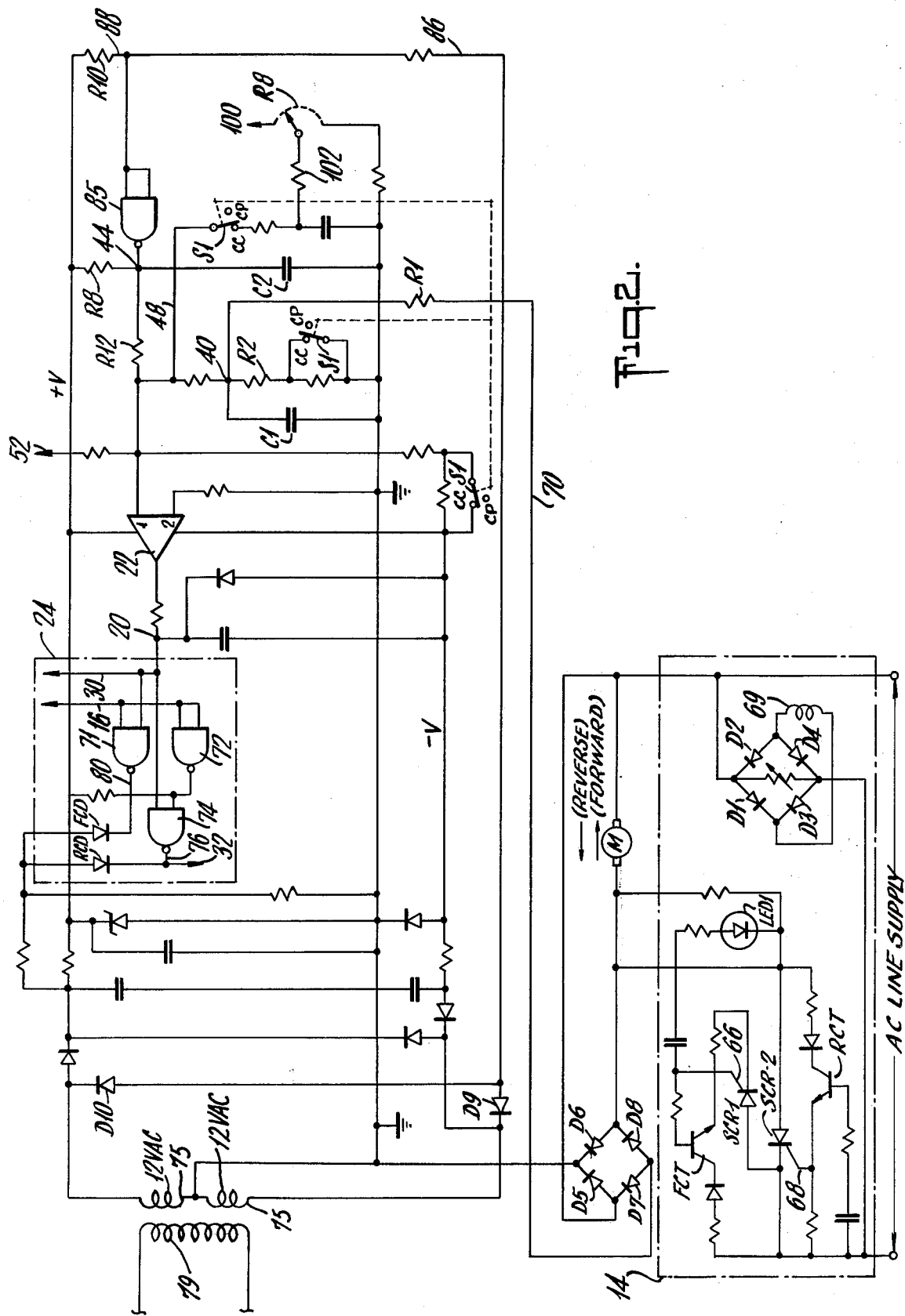
FIG. 2 is a circuit schematic of the governor control illustrating the SCR bi-directional circuit, the emf sensing circuit, the ramp generator, summing network, trigger logic and direction control logic of FIG. 1 respectively.

The back emf sensing circuit 39 of FIG. 1 comprises a full wave bridge rectifier including diodes D5, D6, D7 and D8 respectively. The diodes are connected across motor M to provide a negative feedback signal 70 regardless of the direction of rotation of motor M. The magnitude of the feedback signal 70 is proportional to the back emf of the motor M during periods of coasting. This feedback signal 70 is fed through a voltage divider network represented by resistors R1 and R2 as is shown in FIG. 2 and is thereafter filtered by capacitor C1 to form the feedback signal 40 of FIG. 1 which is then applied through resistor R3 to the operational amplifier 22 at input terminal 1.

The optical phototransistors FCT and RCT are optically excited switches which are turned on in response to the energization of their corresponding photodiodes FCD and RCD respectively. The photodiodes FCD and RCD are located in the trigger circuit 24 shown in dotted lines in FIG. 2 in circuit with an arrangement of Nand gates 71, 72 and 74 respectively. Power to the trigger circuit 24 is derived from the 24 volt AC secondary winding 75 of a control transformer 79 connected to AC line voltage.

Nand gate 74 of the trigger circuit 24 controls the activation of the light emitting photodiode RCD and in turn the reverse drive direction of motor M. The photodiode RCD is energized when the output 76 of the Nand gate 74 goes low. This occurs in response to a high output at terminal 78 of Nand gate 72 and a high output signal 20 from the operational amplifier 22. Nand gate 72 has both of its inputs tied in common and connected to the direction signal 16 from the direction control 18. Accordingly, when the direction signal 16 is low its output terminal 78 will be high and vice versa.

When the output terminal 78 is high and the output signal 20 is high, Nand gate 74 will go low activating photodiode RCD. The forward motor direction, on the other hand, is controlled by the activation of the light emitting photodiode FCD. This occurs in response to a low at the output terminal 80 of Nand gate 71. Nand gate 71 has the direction signal 16 applied as one input and the enable signal 30 as a second input. Accordingly, when the enable signal 30 and the direction signal 16 are high the motor M will be driven in a forward direction. Alternatively, when the enable signal 30 is low both Nand gates 71 and 74 receive a low input inhibiting the operation of motor M and the output 20 of the operational amplifier 22. The motor M is operated in the reverse direction independent of the trigger circuit 24 at the end of a welding operation when the automatic retract braking control 34 is activated as will be explained hereafter in connection with FIG. 3. Upon activating the automatic retract braking control 34 the signal output 32 goes low thereby energizing photodiode RCD.

The ramp generator 46 is also shown in FIG. 2 and includes Nand gate 85 which receives a full wave rectified input signal 86 derived from the secondary winding 75 through diodes D9 and D10 and a positive input signal 88 derived from the impressed voltage +V through resistor R10. When the output 44 of the Nand gate 85 is high it will permit capacitor C2 to charge at a controlled rate toward the impressed voltage +V. When the output 44 drops to zero the capacitor C2 immediately discharges through gate 85. The result is a linearly increasing ramp wave form with a period equal to twice the frequency of the line supply. The slope or time constant for the ramp 44 is determined by the combination of capacitor C2 and resistor R8. The ramp output 44 is fed through the summing resistor R12 to the operational amplifier 22.

A switch S1 permits the operator to adjust the governor control system for use with a constant current "CC" or constant potential "CP" power supply 11. In the constant current mode a signal 48 proportional to the arc voltage 90 is generated by the voltage detector 50 schematically shown in FIGS. 3 and 4 respectively. A full wave rectifier comprising diodes D11, D12, D13 and D14 rectifies the voltage 90 across leads 91 and 92 of the voltage detector 50. The voltage detector 50 includes a light emitting photodiode VDD in series circuit with a variable frequency oscillator circuit 94. The photodiode VDD will detect the presence of a predetermined minimum arc voltage as will be more fully explained hereafter.

The variable frequency oscillator circuit 94 employs a programmable uni-junction transistor PUT-1 having a cathode terminal 95 connected to a light emitting diode VSD which is pulsed at a frequency proportional to the magnitude of the arc voltage. As the arc voltage goes up the oscillating frequency of the uni-junction transistor PUT-1 goes up and vice versa. This is accomplished by biasing the anode 96 of the uni-junction transistor at a fixed DC voltage determined by the zenor diode ZD-1. The gate terminal 97 is tied to the capacitor C3 which charges through resistor R5. As the arc voltage rises, the capacitor C3 will charge a little sooner and fire the uni-junction transistor PUT-1 earlier. As the arc voltage decreases the converse is true. Each time the programmable uni-junction transistor PUT-1 fires the photodiode VSD conducts to generate a pulse of light which energizes phototransistor VST in FIG. 3. The frequency of the light pulses is dependent on the arc voltage. A DC voltage at the anode terminal 100 of the phototransistor VST will be generated proportional to the arc voltage. The voltage at terminal 100 is applied across a sensitivity potentiometer R8 whose wiper arm 102 is adjustable. The wiper arm 102 produces the feedback signal 48 which is fed to the operational amplifier 22 to modulate the speed of the wire feed motor M in proportion to changes in arc voltage. A time delay circuit comprising transistor Q5, capacitor C4 and resistor R6 is used to inhibit phototransistor VST following initiation of a welding arc and until expiration of a predetermined time period after the minimum arc voltage is reached. This prevents a rapid rise in arc voltage causing too rapid an acceleration of the motor M.

The light emitting photodiode VDD in the voltage detector 50 of FIG. 4 will detect the presence of the arc voltage 90 above a predetermined minimum level. This minimum detection level is determined by the choice of the break down voltage for the zenor diode ZD-1. Accordingly, when the arc voltage is high enough, e.g., above 16 volts, current will begin to flow through the photodiode VDD. Photodiode VDD is optically coupled to the phototransistor VDT in FIG. 3. The impressed voltage +V is derived from the secondary winding 75. When the phototransistor VDT turns on it will turn on transistor Q2 which will in turn energize LED-2 to provide a visual indication of the detection of the arc voltage. The combination of resistor R9 and capacitor C5 will integrate the output 106 of phototransistor VDT to maintain Q2 on irrespective of the type of welding arc, i.e., AC or DC. The collector terminal 108 of transistor Q2 is fed through the inverter 110 to terminal 112 of Nand gate 114 in the transfer circuit 54. The transfer circuit 54 operates to automatically provide a feedback weld speed control signal 52 to the operational amplifier 22 dependent upon the presence or absence of arc voltage and arc current and whether the operation is in the welding or inching mode. The inching mode of operation will be discussed later in the specification. The transfer circuit 54 receives a current feedback signal 59 in addition to the voltage detection signal 62.

The current feedback signal 59 is supplied from the current detector 60 which operates in a conventional manner to detect the presence of welding current by sensing a voltage drop across the shunt resistor 12 located in series with the welding power supply 11 and the workpiece W. The current detector circuit 60 as shown in FIGS. 3 and 5 obtains power from the tertiary winding 118 of the control transformer 79. The voltage drop across the shunt 12 is rectified by diodes D15 and D16 and applied to the input terminal 120 of an operational amplifier 122. This voltage is compared to a reference input at terminal 124. The reference input is established from the series resistors R15, R16 and R17 respectively. The output of the operational amplifier 122 is connected to a photodiode CDD and to a visual indicator LED 3. When the output of the operational amplifier 122 is negative, representing current flow through resistor 12, the photodiode CDD is energized and the indicator LED 3 provides a visual display. Activation of photodiode CDD will turn on phototransistor CDT in the transfer circuit 54 representing the flow of welding current through the electrode E. With the phototransistor CDT on the output 126 of the inverter gate 125 goes high. The output 126 is used as the bias potential for the phototransistor VST in the voltage detector circuit 50 to prevent the voltage signal 48 from being generated without current flow.

The transfer circuit 54 operates to alternate from the inch speed potentiometer 58 to the weld speed potentiometer 56 in response to the voltage and current signal conditions generated by the voltage and current detector circuits 50 and 60 respectively. The inch speed potentiometer 58 and weld speed potentiometer 56 are connected through diodes D17 and D18 to the weld speed control signal output 52. The output of the inch speed potentiometer 58 at terminal 130 is connected through diode D19 to the output 131 of Nand gate 132. Nand gate 132 has one input at terminal 134 coupled back to the output 126 of the inverter gate 125 and in turn to the phototransistor CDT. Accordingly, when arc current is detected the logical input at terminal 134 is high. The other input 138 to Nand gate 132 is coupled through the inverter gate 110 to the collector of transistor Q2 in the voltage detector circuit 50. When the arc voltage is of a sufficient minimum to cause phototransistor VDT to be energized as explained earlier, the input 138 to Nand gate 132 goes high. The high inputs at both input terminals 134 and 138 to Nand gate 132 causes the output 131 to go low. This, in turn, grounds out the inch speed potentiometer 58. The output 142 of the weld speed potentiometer 56 is coupled to the output of the inverter gate 144 which is, in turn, connected to the output 131 of Nand gate 132. Accordingly, when the inch speed potentiometer 58 is in circuit the weld speed potentiometer becomes grounded and vice versa.

The welding operation is started by switching the selector switch 35 to the start position. The selector switch 35 is coupled to the welding power supply 11 through a conventional welding contactor (not shown) which activates the power supply 11. The power supply 11 generates an open circuit voltage 90 between the electrode E and the workpiece W in a conventional manner. With the switch 35 in the start position the enable output signal 30 provided by the enable logic 28 goes high. This is due to the low placed on the inverter input 141. The detection of open circuit voltage causes the output 108 of transistor Q2 to go low which causes a logical high to be impressed on the direction signal output 16. At this point in time voltage has been detected but current has not. This causes the output 142 of the weld speed potentiometer 56 to be grounded through the low output of inverter 144. Accordingly, the setting of the inch speed potentiometer 58 will determine the magnitude of the feedback motor speed signal 52 and, as such, the speed of the motor M until the electrode E makes contact with the workpiece W. When contact is established a short circuit current will flow from the welding power supply 11 through the shunt 12, the electrode E and the workpiece W. At the instant of short circuit the arc voltage disappears causing the direction signal 16 to revert to a logical low and in turn causing the current path to the motor M to be reversed. The motor M is therefore driven in the reverse direction at a speed determined by the setting of the inch speed potentiometer 58. As the electrode E breaks away from the workpiece W both current and arc voltage will be present. The detected presence of both current and voltage will cause the transfer circuit 54 to transfer control of the speed of the motor M from the inch speed potentiometer 58 to the weld speed potentiometer 56. With voltage present the direction signal 16 reverts again to a logical high reestablishing the current path through the armature of motor M in the designated forward direction. The electrode wire feed speed is now established by the setting of the weld speed potentiometer 56. The speed of the motor during welding is, of course, dynamically responsive to changes in the back emf of the motor and to changes in arc voltage.

To stop welding, the selector switch 35 is placed into the stop position. In this position the enable signal 30 goes low disabling the motor speed control. The breaking of the motor M is controlled by the retract brake circuit 34 schematically illustrated in FIG. 3. During a welding operation transistor Q6 is in the on state whereas transistor Q7 is in the off state and the capacitor C5 is fully charged to the impressed potential +V. With transistor Q7 off the retract brake signal output 30 is at open circuit. Upon switching to the stop position the transistor Q7 is immediately energized through transistor Q6 imposing a logical low on the retract brake signal output 32 which activates photodiode RCD causing a reversal in the motor direction. The motor will reverse at full speed since the comparator signal output 20 is disabled when the enable signal 30 goes low. Capacitor C5 begins to discharge through the bias resistors R10 and R11 and through the combined resistance of resistors R13 and the in circuit resistance of potentiometer R12 as selected by the adjustment of wiper arm 150. During this controlled period of discharge transistor Q6 is held in the on state. Once capacitor C5 is discharged, transistor Q6 is deenergized disabling transistor Q7. This reverts the retract brake output signal 30 to open circuit and the motor M is permitted to stop. It should be understood that the braking action of the present invention is based upon a reversal in direction for a controlled period of time and not by the usual braking of the motor M through a braking resistor.

The electrode may be inched toward the workpiece in a conventional manner by setting the inch control switch 36 to the desired forward or reverse inch direction. In the inching mode of operation only the inch speed potentiometer 58 is enabled to control the motor speed. This is due to the fact that neither the current nor voltage detector is energized. Assuming a forward inching operation is desired, the operator will select the forward direction which places a logical low on the input 160 to Nand gate 114 causing the direction signal 16 to go high which enables the forward direction path in the bi-directional drive circuit 14. A logical low is also impressed on the input 144 to Nand gate 141 which causes the enable signal 30 to go high. The enable signal 30 operates to enable the operational amplifier 22 to control motor speed.

What is claimed is:

1. An electric welding system including an electrode, a workpiece, a power supply connected in series circuit relationship with said electrode and workpiece, a drive motor for feeding said electrode relative to said workpiece and a governor control system for controlling the speed and direction of rotation of said drive motor, said governor control system comprising:
   a source of driving potential;
   a bi-directional circuit including a first circuit drive means for connecting said source of driving potential across said drive motor in a first direction and a second circuit drive means for connecting said source of driving potential across said drive motor in a second direction opposite said first direction;
   means for generating a current signal in response to the presence of current in said series circuit;

means responsive to arc voltage for generating a first voltage signal when the arc voltage is above a predetermined magnitude and a second voltage signal which varies in magnitude in proportion to variation in arc voltage;

means for generating a direction signal having a first logical output state in response to the presence of said first voltage signal and having a second logical output state in response to the absence of said first voltage signal;

logic means for enabling said first and second circuit drive means in response to the logical output state of said direction means;

first adjustable means for providing a first speed control signal;

second adjustable means for providing a second speed control signal;

speed control means for controlling the speed of the motor in response to said second voltage signal and to said first and second control signals; and transfer circuit means responsive to said current signal and said first voltage signal for inhibiting either said first speed control signal or said second speed control signal such that when said current signal is present in the absence of said first voltage signal said second speed control signal is inhibited and when both said current and voltage signals are present said first speed control signal is inhibited.

2. An electric welding system as defined in claim 1 wherein said first direction represents the forward direction of the motor for driving said electrode toward the workpiece and wherein said second direction represents the reverse direction of the motor for driving said electrode away from the workpiece, said system further comprising switch means having a start position and a stop position and braking means responsive to said stop position for enabling said second circuit drive means for a predetermined time period following termination of welding and including means for disabling said logic means.

3. An electric welding system as defined in claim 2 wherein said braking means comprises adjustable timing means for controlling said time period during which said second circuit drive means is enabled.

4. An electric welding system as defined in claim 3 wherein each of said first and second circuit drive means respectively comprises a silicon controlled rectifier and switch means for firing said silicon controlled rectifier.

5. An electric welding system as defined in claim 4 wherein said speed control means comprises:

means responsive to the back emf signal;

means for generating a ramp signal which varies periodically from a first DC potential to a second DC potential at a rate in synchronism with each half cycle of said source of driving potential;

means for generating a DC output voltage in response to said second voltage signal; and means for comparing the addition of said back emf signal, said ramp signal, said DC output voltage and said first and second control signals to a fixed reference for providing a periodic output control signal for controlling the duration of energization of said switch means in each of said circuit drive means respectively.

6. An electric welding system as defined in claim 5 wherein said means for generating said DC output voltage comprises variable frequency oscillator means and means for varying the output frequency thereof in response to changes in arc voltage.

* * * * *